(12) United States Patent
Schweiger

(10) Patent No.: US 6,179,298 B1
(45) Date of Patent: Jan. 30, 2001

(54) SNAP-LOCK ATTACHMENT ELEMENT FOR LAMINATING MULTIPLE GASKET LAYERS AND METHOD OF USING SAME

(75) Inventor: David J. Schweiger, Downers Grove, IL (US)

(73) Assignee: Dana Corporation, Toledo, OH (US)

( * ) Notice: Under 35 U.S.C. 154(b), the term of this patent shall be extended for 0 days.

(21) Appl. No.: 09/184,816

(22) Filed: Nov. 2, 1998

(51) Int. Cl.$^7$ ...................................................... F16J 15/02
(52) U.S. Cl. .......................... 277/598; 277/600; 277/637; 277/654; 29/888.3; 24/618
(58) Field of Search .................................. 277/598, 600, 277/630, 637, 650, 654; 29/888.3, 453, 449, 446; 24/618, 623, 627

(56) References Cited

U.S. PATENT DOCUMENTS

| 350,020 | * | 9/1886 | Shipman | 24/627 |
| 1,320,496 | * | 11/1919 | Roth | 24/627 |
| 1,607,145 | * | 11/1926 | Anderson | 24/627 |
| 3,367,809 | | 2/1968 | Soloff | 156/73.1 |
| 4,456,644 | | 6/1984 | Janz et al. | 428/158 |
| 4,822,671 | | 4/1989 | Carper et al. | 428/33 |
| 5,084,324 | | 1/1992 | Schirmer | 428/139 |

FOREIGN PATENT DOCUMENTS

0588049 * 5/1947 (GB) ...................................... 24/627

* cited by examiner

Primary Examiner—Anthony Knight
Assistant Examiner—E Peavey
(74) Attorney, Agent, or Firm—Rader, Fishman & Grauer PLLC

(57) ABSTRACT

A snap-lock attachment element for connecting a multi-layered gasket having at least two metallic gasket layers together in a sealing gasket is disclosed. A first gasket layer includes an aperture with at least two fingers extending radially inwardly. A second gasket layer includes a second aperture having a supporting member with slots therein. The first gasket layer is pressed onto the second layer such that the fingers engage the slots of the second gasket layer in snap-lock engagement.

22 Claims, 2 Drawing Sheets

SNAP-LOCK ATTACHMENT ELEMENT FOR LAMINATING MULTIPLE GASKET LAYERS AND METHOD OF USING SAME

FIELD OF THE INVENTION

The present invention relates to a gasket and more particularly to a multiple layer gasket having a snap-fit attachment element to positively attach multiple gasket layers together.

BACKGROUND OF THE INVENTION

Gaskets are often used to seal mating mechanical components. One common application involves the placement of a gasket between a head and an exhaust manifold of an internal combustion engine. Another application involves gasket placement between the exhaust manifold and an exhaust pipe flange. Gaskets for either application are considered high temperature gaskets and more particularly exhaust manifold gaskets since they provide an exhaust seal that prevents the by-products of combustion exiting the combustion chamber from escaping a vehicle engine.

In a metallic laminate gasket for an exhaust manifold of an internal combustion engine, the gasket is formed from a plurality of metallic gasket layers laminated together. The metallic layers provide structural support between the manifold and engine block, and radial strength to resist gasket blow-out due to combustion chamber generated pressures. Typically, the metallic layers are laminated together by welding. However, welding is undesirable for a number of applications. For example, welding is a time consuming process and involves specialized tooling, thus increasing manufacturing costs. Further, the metallic layers may become warped, thereby compromising sealing effectiveness, due to the high weld temperatures generated. Additionally, weld beads formed by the welding operation may reduce the force available for sealing the gasket layers as weld beads can interfere with mating members before they are fully tightened together.

To avoid the difficulties associated with welding, it has been known to provide a metallic gasket with a plurality of bending strips that cooperate with holes for connecting first and second metal plates together. A hole is formed in the first plate while a bending strip extends from the second plate. The bending strip is passed through the hole of the first plate where it is bent over to engage an outer surface of the first plate. While the use of bending strips is less expensive than welding, a bending strip produces localized stress loading, which may compromise gasket sealing effectiveness over time. Further, the edges of the bending strip are unprotected. Therefore, the bending strip may become accidentally dislodged from the hole or otherwise damaged. In addition, the bending strips are often have limited effectiveness in gaskets that are subject to high frictional forces because the frictional forces cause buckling and sliding of the metallic plates, thereby resulting in the bending strips becoming partially disengaged from the first plate. Once again, sealing effectiveness is potentially compromised.

SUMMARY OF THE INVENTION

The present invention is directed to a snap-fit attachment element for laminating multiple metallic gasket layers together in a multi-layered sealing gasket.

The sealing gasket has at least two metallic gasket layers. A first metallic gasket layer includes at least one pre-blanked first aperture having a plurality of fingers extending radially inwardly from a peripheral edge of the first aperture. A second metallic gasket layer includes at least one second aperture and a supporting member formed on a peripheral edge of the second aperture. The supporting member extends upwardly from a first surface of the second gasket layer. The supporting member is preferably formed in a stamping operation such that the supporting member is integrally formed with the second metallic gasket layer. The supporting member includes a base portion and a closed end portion with the base portion connecting the supporting member to the second metallic gasket layer. At least two slots for receiving the fingers of the first metallic gasket layer are formed in the base portion of the supporting member. Preferably the slots are cut into a section of the second metallic gasket layer prior to the stamping operation so as to insure proper slot positioning.

To laminate the metallic gasket layers together, the first and second metallic gasket layers are arranged in an overlying manner such that the first aperture of the first metallic gasket layer is aligned with the supporting member of the second metallic gasket layer and the fingers are aligned with the slots. A laminating tool is then brought into contact with a first surface of the first metallic layer. The laminating tool has an engaging portion and a flexing portion that has a length slightly greater than the length of the engaging portion. The flexing portion elastically flexes the fingers to permit the supporting member of the second gasket layer to be extend through the first aperture of the first metallic gasket layer. Simultaneous with the flexing action, the engaging portion moves the first metallic layer into face-to-face contact with the second metallic layer. When the supporting member has extended through the first aperture, the fingers matingly engage the corresponding slots, disposing distal ends of the fingers into a chamber formed by the closed end portion and the base portion of the supporting member, thereby permanently laminating the first and second metallic gasket layers together without welding or the use of any additional fasteners. Further, as distal ends of the fingers are disposed within the chamber, the fingers are protected against possible damage, thereby insuring that the first and second metallic gasket layers do not become accidentally dislodged.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
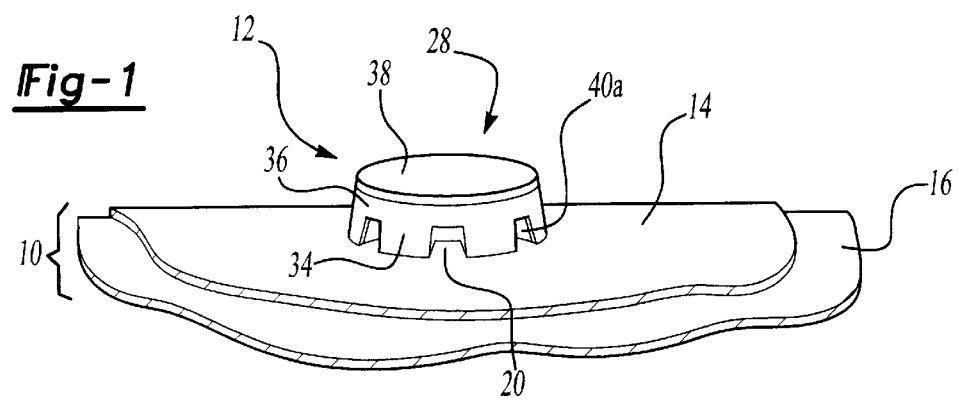
FIG. 1 is a perspective view of a multi-layer metallic sealing gasket for sealing a combustion chamber having a supporting member for laminating multiple metallic gasket layers together in accordance with the present invention.
Figure 2:
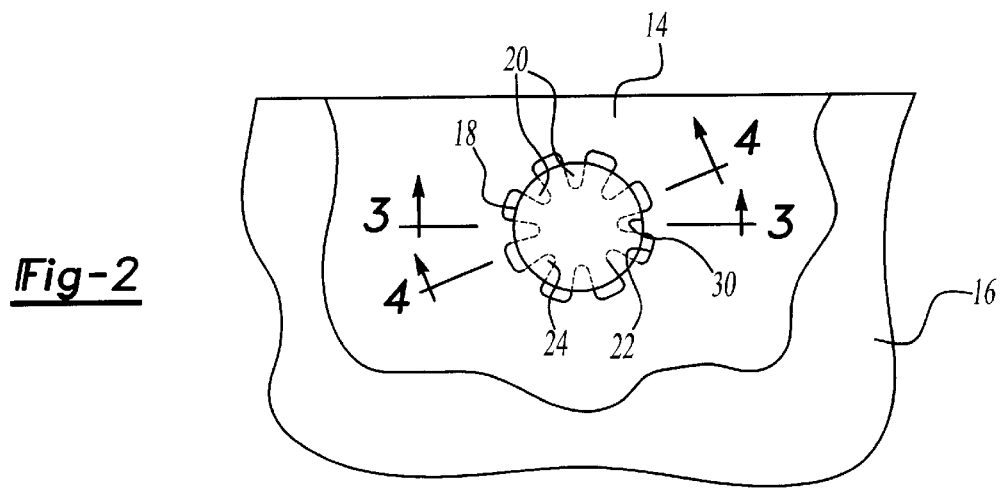
FIG. 2 is a plan view of the multi-layer sealing gasket in FIG. 1.

FIGS. 1–4 depict a sealing gasket 10 constructed from multiple metallic gasket layers that are quickly and easily laminated together by a snap-fit attachment element 12. Gasket 10 preferably includes at least two metallic gasket layers, a first gasket layer 14 and a second gasket layer 16. Each gasket layer may be formed from different metals. However, it is preferred that both first and second gasket layers 14 and 16 are formed from stainless steel due to its strength and durability. In accordance with the present invention, first gasket layer 14 is pre-blanked to include at least one first aperture 18 with a plurality of fingers 20 extending therefrom. Fingers 20 extend radially inwardly from a peripheral edge 22 of first aperture 18. Fingers 20 may have identical shapes, such as a generally rectangular shape as shown in FIG. 2. Alternatively, each finger 20 may have a unique shape so as to insure alignment, to be explained below in greater detail. Preferably, each finger 20 terminates at a distal end 24 that is preferably radiused, as explained below in greater detail.

Second gasket layer 16 includes at least one second aperture 26 and a supporting member 28 formed on a peripheral edge 30 of second aperture 26. Supporting member 28 extends upwardly from a first surface 32 of second gasket layer 16. In a preferred embodiment, second gasket layer 16 is subjected to a stamping operation wherein a stamping die forms supporting member 28 integral with second gasket layer 16 to a pre-determined height and wall thickness in one operation. Thus, the number of manufacturing steps in constructing gasket 10 are reduced and the structural rigidity of supporting member 28 is enhanced. The height of supporting member 28 is determined by the number of layers to be laminated. In the preferred embodiment, the height of supporting wall 28 is determined by the thickness and number of layers to be laminated. The wall thickness of supporting member 28 is dependent upon the structural strength of the particular metal being used for second gasket layer 16. In the preferred embodiment, the wall thickness of supporting member 28 is approximately 1 mm.

Figure 3:
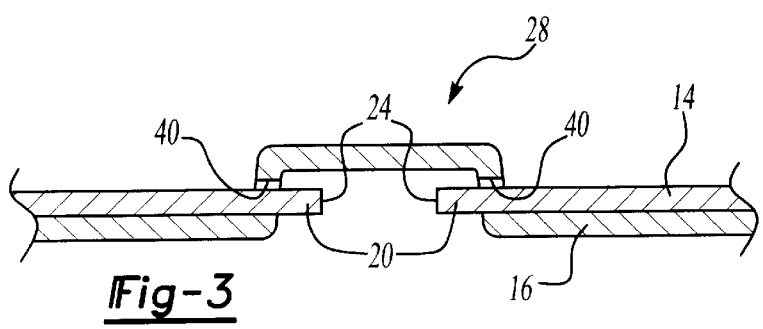
FIG. 3 is a cross-sectional view of the multi-layer sealing gasket taken along line 3—3 of FIG. 2.
Figure 4:
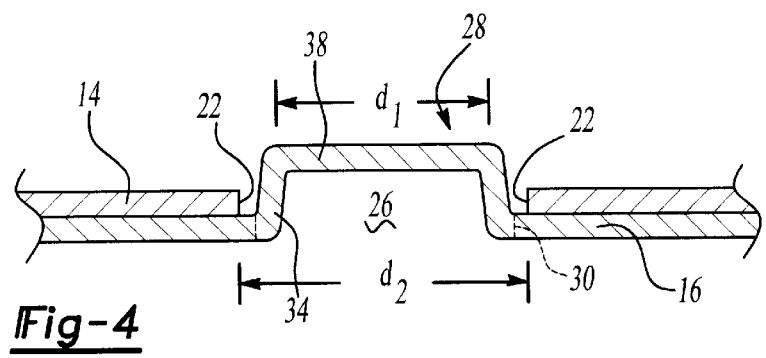
FIG. 4 is a cross-sectional view of the multi-layer sealing gasket taken along line 4—4 of FIG. 2.

Supporting member 28 includes a base portion 34 and a closed end portion 38. Base portion 34 connects supporting member 28 to second gasket layer 16. Base portion 34 further includes a plurality of slots 40 formed therein, as best seen in FIG. 3. Slots 40 are preferably cut into a section of second gasket layer 16 that forms supporting member 28, prior to the stamping operation to insure proper placement of slots 40 on supporting member 28. However, slots 40 may be alternatively cut into base portion 34 of supporting member 28 after the stamping operation has occurred. Slots 40 have a shape that generally corresponds to the cross-sectional shape of fingers 20. Further, slots 40 generally have a height and width that is slightly larger than the height and width of fingers 20 such that fingers 20 may be easily received in slots 40.

End portion 38 is spaced away from and is generally parallel to first surface 32 to provide structural rigidity to supporting member 28. To insure the sealing effectiveness of gasket 10, end portion 38 is ideally positioned directly above slots 40, to reduce the effects of compression forces upon supporting member 28 during sealing. Supporting member 28 has a diameter that is smaller than the diameter of first aperture 18 in first gasket layer 14 such that supporting member 28 may extend through first aperture 18 when first gasket layer 14 is laminated to second gasket layer 16. Preferably, end portion 38 has a predetermined diameter $d_1$ and base portion 34 has a predetermined diameter $d_2$, whereby $d_1 < d_2$ such that supporting member 28 is tapered to allow for proper alignment of first gasket layer 14 relative to second gasket layer 16 during the lamination process.

Figure 5:
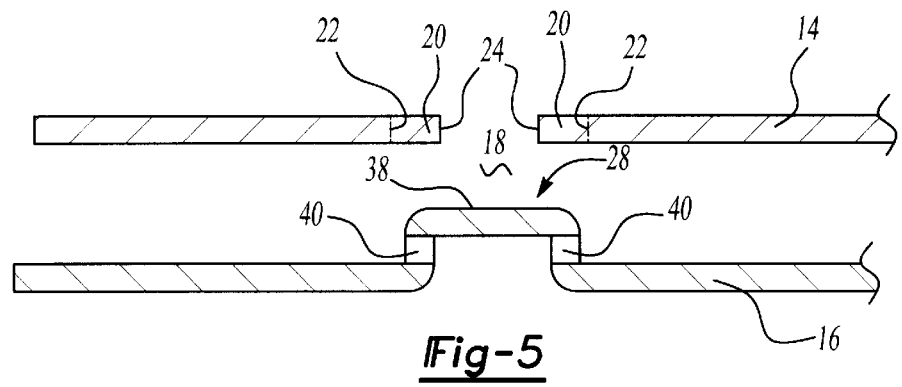
FIGS. 5–7 are cross-sectional views of a laminating tool and metallic gasket layers in a laminating process for laminating the metallic gasket layers together in accordance with the present invention.
Figure 6:
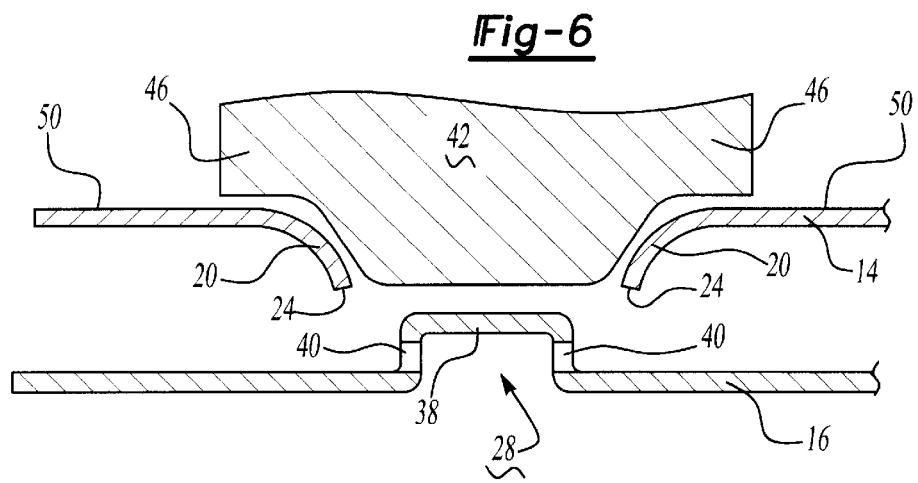
Figure 7:
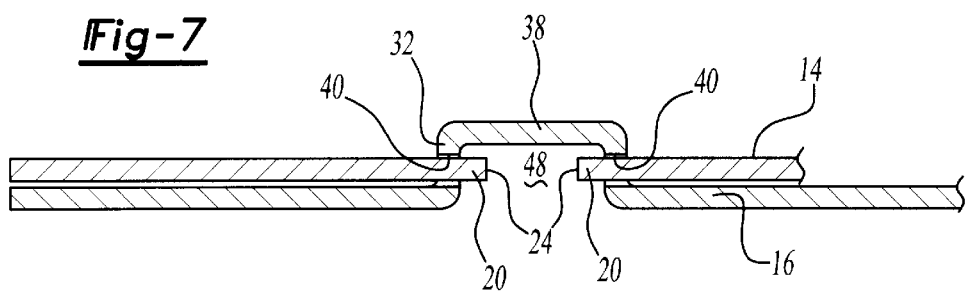

With reference to FIGS. 3–7, the use of the attachment element 12 to laminate first and second metallic gasket layers 14 and 16 is illustrated. First gasket layer 14 is positioned adjacent to second gasket layer 16 in an overlying manner whereby first aperture 18 is generally aligned with supporting member 28, and fingers 20 are oriented so as to be aligned with slots 40, as seen in FIG. 5. In a preferred embodiment, each finger 20 and corresponding slot 40 is provided with identifying indicia (not shown) to insure the correct alignment of fingers 20 to slots 40. A laminating tool 42 having a flexing portion 44 and an engaging portion 46 is provided to facilitate face-to-face contact between first and second gasket layers 14 and 16. In the preferred embodiment, laminating tool 42 is positioned directly above first aperture 18 and is operated downwardly with flexing portion 44 elastically flexing fingers 20 to permit end portion 38 to extend through first aperture 18 of first gasket layer 14. Simultaneous with the flexing of fingers 20, engaging portion 46 contacts a first surface 50 of first gasket layer 14 and pushes first gasket layer 14 into face-to-face engagement with second gasket layer 14, as seen in FIG. 6. After end portion 38 has extended though first aperture 18 and first and second gasket layers 14 and 16 are in face-to-face engagement, fingers 20, which are aligned with slots 40, engage slots 40 in base portion 34 and spring back into a generally planar orientation to permanently attach fingers 20 to supporting member 28 in a snap-fit engagement, as shown in FIG. 7. Preferably, distal ends 24 are radiused such that distal ends 24 slide into slots 40 with ease. Distal ends 24 are captured by supporting member 28 and disposed within a chamber 48 formed by base portion 34 and closed end portion 38, as seen in FIGS. 3 and 7. Thus, first and second metallic gasket layers 12 and 14 are quickly and easily laminated together permanently in face-to-face engagement without welding or the use of any additional fastening devices. Further, because end portion 38 is closed, distal ends 24 of fingers 20 are protected from possible damage. Thus, fingers 20 will not become accidentally dislodged from slots 40.

Figure 8:
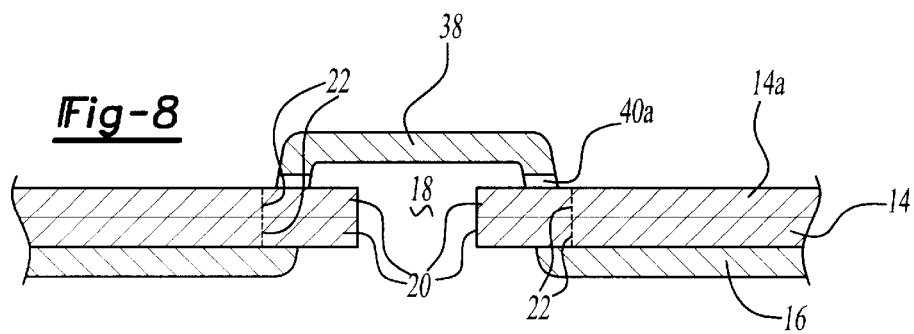
FIG. 8 is a cross-sectional view of an alternative embodiment of a multi-layer sealing gasket in accordance with the present invention.

Snap-fit attachment element 12 may also be used with more than two metallic gasket layers. For example, referring to FIGS. 1 and 8, to use snap-fit attachment element 12 with a three or more layer metallic gasket, supporting member 28 of second gasket layer 16 would be provided with transversely extending groove-like slots 40a that extend upwardly from base portion 34 through an intermediate portion 36. Slots 40a have a height that is considerably greater than the thickness of a first gasket layer 14. Referring to FIG. 8, for a three layer metallic gasket, two, substantially identical first gasket layers 14 and 14a would be provided, each having a pre-blanked first aperture 18 with a plurality of fingers 20 extending radially inwardly from a peripheral edge 22 of first aperture 18. First gasket layers 14 and 14a are each laminated to second gasket layer 16 in the manner described above with fingers 20 in snap-fit engagement with slots 40a.

While supporting member 28 and first aperture 18 have been described in connection with a circular shape, it is understood that the present invention may be modified to include other additional shapes without departing from the teaching of the invention.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A snap-fit attachment element for a multiple layer metallic sealing gasket, comprising:
   a first metallic gasket layer having at least a first aperture formed therein and at least two engaging fingers integrally formed on a peripheral edge of said first aperture; and
   a second metallic gasket layer having at least a second aperture formed therein, said second metallic gasket layer further including at least one integrally formed supporting member having at least two slots formed therein, said supporting member being formed on a peripheral edge of said second aperture so as to extend upwardly from a first surface of said second metallic gasket layer;
   wherein first and second metallic gasket layers are positioned in face-to-face engagement such that said first and second apertures are aligned with one another and said first and second metallic gasket layers are in planar contact with one another, said supporting member extending upwardly through said first aperture of said first metallic gasket layer and said fingers being aligned with and extending through said slots in said supporting member in a snap-fit engagement to effectuate lamination of said first and second metallic gasket layers together.

2. The attachment element of claim 1, wherein said fingers extend radially inwardly from said peripheral edge of said first aperture.

3. The attachment element of claim 1, wherein said supporting member has a base portion and an end portion, said supporting member being integral with said second metallic layer at said base portion.

4. The attachment element of claim 3, wherein said supporting member is tapered such that said base portion has a first diameter that is greater than a second diameter of said end portion, said first diameter of said base portion being smaller than the diameter of said first aperture of said first metallic gasket layer such that said supporting member may be received in and extend upwardly therethrough said first aperture to permit alignment of said first and second metallic gasket layers.

5. The attachment element of claim 3, wherein said slots are formed in said base portion.

6. The attachment element of claim 3, wherein said supporting member further includes an intermediate portion, said intermediate portion formed between said base portion and said end portion, said slots extending transversely in said intermediate portion.

7. The attachment element of claim 3, wherein said end portion is closed and provides structural rigidity to said supporting member.

8. The attachment element of claim 7, wherein said closed end portion cooperates with said base portion to form a chamber, distal ends of said fingers being stored in said chamber when said fingers are engaged with said slots such that said distal ends of said fingers are protected against damage.

9. The attachment element of claim 1, wherein said fingers have distal ends, said distal ends being radiused.

10. The attachment element of claim 1, wherein said fingers are flexible, such that said fingers may be flexed elastically.

11. The attachment element of claim 1, wherein each of said fingers has a unique shape and said supporting member having complementary shaped slots for receiving each of said fingers insure proper alignment of said first and second metallic gasket layers.

12. A snap-fit attachment element for a multiple layer metallic sealing gasket, comprising:
   a first metallic gasket layer having at least a first aperture formed therein and a plurality of engaging fingers integrally formed and extending radially inwardly from a peripheral edge of said first aperture; and
   a second metallic gasket layer having at least a second aperture formed therein, said second metallic gasket layer further including at least one integral supporting member formed on a peripheral edge of said second aperture so as to extend upwardly from a first surface of said second metallic gasket layer, said supporting member having a base portion and a closed end portion, wherein said base portion includes a plurality of slots formed therein;
   wherein first and second metallic gasket layers are positioned in face-to-face engagement and are in planar contact with one another such that said supporting member extends upwardly through said first aperture of said first metallic gasket layer and said fingers are aligned with and extend through said slots so as to be in mating engagement with said slots in said supporting member to effectuate lamination of said first and second metallic gasket layers together in snap-lock engagement.

13. The sealing gasket of claim 12, wherein said supporting member is tapered such that said base portion has a first diameter that is greater than a second diameter of said end portion, said first diameter of said base portion being smaller than a diameter of said first aperture of said first metallic gasket layer such that said supporting member may be received in said first aperture.

14. The sealing gasket of claim 12, wherein said supporting member further includes an intermediate portion positioned between said base portion and said end portion, said slots extending transversely from said base portion to said intermediate portion.

15. The attachment element of claim 12, further including a laminating tool, said laminating tool contacting one of said first and second metallic gasket layers and pushing said one of said first and second metallic gasket layers into face-to-face engagement with the other of said first and second metallic gasket layers, whereby said fingers are aligned with and brought into snap-fit engagement with said slots of said supporting member.

16. A snap-fit attachment element for a multiple layer metallic sealing gasket, comprising:
   a first metallic gasket layer having at least a first aperture formed therein and at least two engaging fingers formed on a peripheral edge of said first aperture; and
   a second metallic gasket layer having at least a second aperture formed therein, said second metallic gasket layer further including at least one supporting member having at least two slots formed therein, said supporting member being formed on a peripheral edge of said second aperture so as to extend upwardly from a first surface of said second metallic gasket layer; and
   a laminating tool contacting one of said first and second metallic gasket layers and pushing said one of said first and second metallic gasket layers into face-to-face engagement with the other of said first and second metallic gasket layers such that said first and second apertures are aligned with one another, whereby said supporting member extends through said first aperture of said first metallic gasket layer, said fingers being oriented so as to be aligned with said slots and flexed elastically until said fingers engage said slots in snap-fit engagement to effectuate lamination of said first and second metallic gasket layers together.

17. The attachment element of claim 16, wherein said laminating tool has a flexing portion and an engaging portion, whereby said laminating tool contacts said first metallic gasket layer such that said flexing portion elastically flexes said fingers to permit said supporting member to extend through said first aperture of said first metallic gasket layer as said engaging portion said moves said first metallic gasket layer into face-to-face engagement with said second metallic gasket layer.

18. The attachment element of claim 17, wherein said first metallic gasket layer is permanently laminated to said second metallic gasket layer.

19. The attachment element of claim 16, wherein said laminating tool has a flexing portion and an engaging portion, whereby said laminating tool contacts said first metallic gasket layer such that said flexing portion elastically flexes said fingers that are oriented so as to be in alignment with said slots, so as to permit said supporting member to extend through said first aperture of said first metallic gasket layer and matingly engage said fingers with said slots of said supporting member as said engaging portion moves said first metallic gasket layer into face-to-face engagement with said second metallic gasket layer.

20. A method of laminating multiple gasket metallic gasket layers of a multi-layered sealing gasket, comprising:

providing at least one first metallic gasket layer having an aperture formed therein with a plurality of inwardly radially extending fingers formed on a peripheral edge of said aperture;

providing a second metallic gasket layer having an aperture formed therein with a supporting member positioned around a periphery of said aperture, said supporting member extending upwardly from a first surface of said first metallic gasket layer and having a plurality of slots formed in said supporting member;

providing a laminating tool to contact and move one of said first and second metallic gasket layers into face-to-face engagement with the other of said first and second metallic gasket layers moving said first and second metallic gasket layers towards face-to-face engagement with one another;

elastically flexing said fingers to permit said supporting member to extend through said first aperture of said first metallic gasket layer; and engaging said fingers of said first metallic gasket layer with said slots of said second metallic gasket layer to effectuate lamination of said first and second metallic gasket layers together.

21. The method of laminating as in claim 20, further including the step of aligning said fingers with said slots.

22. The method of laminating as in claim 20, said laminating tool contacting said first metallic gasket layer and elastically flexing said fingers while simultaneously moving said first metallic gasket layer into face-to-face engagement with said second metallic gasket layer.

\* \* \* \* \*